(12) United States Patent
Donck

(10) Patent No.: US 6,673,878 B2
(45) Date of Patent: Jan. 6, 2004

(54) TUBULAR POLYMERIZATION REACTORS AND POLYMERS MADE THEREIN

(75) Inventor: Jan Cyriel Donck, Holsbeek (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/454,545

(22) Filed: Jun. 4, 2003

(65) Prior Publication Data

US 2003/0206835 A1 Nov. 6, 2003

Related U.S. Application Data

(63) Continuation-in-part of application No. 10/028,552, filed on Dec. 19, 2001, now Pat. No. 6,596,241.

(51) Int. Cl.[7] .................................................. C08F 2/00
(52) U.S. Cl. ........................ 526/64; 526/65; 526/68; 526/89; 526/208; 526/352; 422/132
(58) Field of Search ............................ 526/64, 65, 68, 526/89, 208, 352; 422/132

(56) References Cited

U.S. PATENT DOCUMENTS 4,153,774 A  *  5/1979  Boettcher et al. ........ 526/352.2
6,262,191 B1  *  7/2001  Hottovy et al. ............... 526/64
6,262,292 B1      7/2001  Yasuda et al. .............. 558/415

OTHER PUBLICATIONS

Ehrlich, P., et al., *Fundamentals of the Free–Radical Polymerization of Ethylene*, Advances in Polymer Science, vol. 7, pp. 386–448 (1970).

* cited by examiner

Primary Examiner—David W. Wu
Assistant Examiner—William Cheung
(74) Attorney, Agent, or Firm—Andrew B. Griffis

(57) ABSTRACT

Tubular reactor apparatus and processes are provided for improved polymerization including using chain transfer agents and multiple monomer feeds spaced lengthwise along the tubular reactor providing high conversions of monomer into polymer. The invention also relates to polymers made from such a tubular reactor apparatus and processes including those polymers having a low haze value, a density over 0.92 g/cm$^3$ and/or having terminal carbonyl groups. The apparatus and methods uncouple or reduce the dependency between the monomer concentration and transfer agent concentration. The uncoupling in other embodiments may also be varied leading to multiple desirable effects.

10 Claims, 3 Drawing Sheets

TUBULAR POLYMERIZATION REACTORS AND POLYMERS MADE THEREIN

CROSS-REFERENCE TO RELATED APPLICATIONS

This application is a continuation-in-part of, and claims the benefit of U.S. application Ser. No. 10/028,552, filed Dec. 19, 2001 now U.S. Pat. No. 6,596,241, which is incorporated by reference herein.

FIELD OF THE INVENTION

This invention relates to an apparatus and processes for improved polymerization in tubular polymerization reactors, including those using chain transfer agents and multiple monomer feeds spaced lengthwise along the tubular reactor, to provide high conversions of monomer into polymer. The invention also relates to polymers made from such processes and apparatus, including those polymers having a low haze value, a density over 0.92 g/cm$^3$ and/or having terminal carbonyl groups.

BACKGROUND

Tubular polymerization reactor apparatus is used to make polyethylene, mainly by free radical initiation. Initiators may be oxygen, peroxides and similar agents. Catalysts used for coordination polymerization may also, where appropriate, be used.

The highly exothermic polymerization reaction is performed in a tubular reactor ("tube") forming part of the apparatus under high reactor operating pressure (2000 bar to 3500 bar) under turbulent flow, at high temperatures (120° C. to 330° C.). Heat may be removed through the tube wall, which may be liquid cooled. Tubular reactors may have outputs, which vary from 50 kT to 400 kT per annum. Low cost production requires a high conversion of monomers to give as large an output of commercially desirable polymer types as is possible from given investment.

Referring to FIG. 1, a tubular polymerization reactor 100 has a tube 2 with a length typically from 200 to 1600 meters determined on the basis of the desired heat removal capacity and a diameter of from 20 to 100 mm determined on the basis of the desired capacity and the required turbulent flow.

A medium pressure, primary compressor 4, which may include a number of compressor stages, not individually shown, is connected at its intake side to a source of fresh ethylene supplied by a conduit 6, and recycled ethylene from a recycle conduit 8 at a pressure of from 20 to 70 bar. The primary compressor raises the pressure of the monomer on the outlet side to a pressure of from 250 bar to 350 bar. A high pressure, secondary compressor 5, which may include a number of compressor stages, is connected at its intake side to the outlet side of the primary compressor 4 and raises the pressure of the feed containing ethylene further to the reactor operating pressure as indicated above of from 2000 to 3500 bar. The compressed pressurized monomer is then fed through conduits 12, 14 to various monomer feed locations 3 spaced lengthwise along tube 2.

Multiple free-radical initiator or catalyst injection positions 7 are also spaced lengthwise of the tube 2 to cause the monomer to be converted into polymer in at least two reaction zones formed inside the tube 2.

A mixture of polymer and unreacted monomer formed in the tube 2 passes from tube outlet 16 to a separating and recycling part of the polymerization apparatus. This part includes a high-pressure separator (HPS) 18, which receives the monomerpolymer mixture from the outlet of the tube 2. The HPS is connected to convey a mixture of polymer and monomer produced, to a low-pressure separator (LPS) 20 for further monomer removal. The resulting molten polymer phase is passed from the LPS 20 to a polymer finishing section with an extruder 22. A volatile monomer-rich phase comprising unreacted monomer separated in HPS 18, passes through a recycle conduit 24 at a pressure of approximately that of the outlet of the primary compressor 4 through line 26 to join the monomer containing feed passing from the primary to the secondary compressor 5. The volatile monomer rich phase including unreacted monomer from the LPS 20 passes to a low pressure purge compressor 21, which may have a number of stages, at a pressure above that at the intake of the primary compressor to the intake of the primary compressor 4.

At some location in the circuit a chain transfer agent is added for supply to the tube 2. Transfer agents are used to reduce the molecular weight, which can be expressed in a melt index (MI) value, and to narrow the molecular weight distribution (MWD).

A typical product range is shown in FIG. 2 and covers a melt index ("MI", $I_{2.16}$) of from 0.1 to 50 dg/min, a molecular weight distribution (MWD) of from 5 to 50 and a haze of from 1 to 20. Haze is determined by ASTM D-1003; MI is determined by ASTM-1238 Condition E; Mw and Mn were measured by GPC (Gel Permeation Chromatography) on a Waters 150 gel permeation chromatograph equipped with a differential refractive index (DRI) detector and a Chromatix KMX-6on line light scattering photometer. The system was used at 135° C. with 1,2,4-trichlorobenzene as the mobile phase. Shodex (Showa Denko America, Inc) polystyrene gel columns 802, 803, 804 and 805 were used. This technique is discussed in "Liquid Chromatography of Polymers and Related Materials III", J. Cazes editor, Marcel Dekker. 1981, p. 207, which is incorporated herein by reference. No corrections for column spreading were applied; however, data on generally accepted standards, e.g., National Bureau of Standards Polyethylene 1484, and anionically produced hydrogenated polyisoprenes (an alternating ethylene-propylene copolymer) demonstrated that such corrections on Mw/Mn (=MWD) were less than 0.05 units. Mw/Mn was calculated from elution times. The numerical analyses were performed using the commercially available Beckman/CIS customized LALLS software in conjunction with the standard Gel Permeation package. Calculations involved in the characterization of polymers by $^{13}$CNMR follow the work of F. A. Bovey in "Polymer Conformation and Configuration" Academic Press, New York, 1969.

In practical use of the apparatus, product quality has to be balanced with desired production economics. Higher conversion (giving low energy and recycle costs) tends to lead to a broader MWD and significant branching which leads to high and unacceptable haze values. Low density polyethylene requires production of relatively many short chain branches. Olefinically unsaturated comonomers are then used which have a low transfer coefficient (efficiency of transfer agents) and hence little chain length reducing activity. Examples are propylene or butene-1. A high concentration of such comonomers is needed to achieve a desired melt index, restricting the productive capacity on a given reactor. In some cases, certain areas of theoretically available MI, haze and density combinations cannot be produced at an acceptable cost. Particularly narrow molecular weight distribution (MWD), relatively high density polyethylenes generally cannot be made economically with saturated alkane transfer agents (which do not incorporate in the chain) as they have a very low transfer constant, lower than the propylene and butene-1 used for low density polyethylenes.

An initiator or catalyst injection position is associated with each reaction zone. Injection of the initiator causes an exothermic temperature rise which is removed by a cooling at the zone and downstream of that zone. The cooling is effected through the tube wall, optionally aided by a cooling liquid as a heat transfer medium and/or by a feed of cold monomer that is added downstream. Further, initiator may be added downstream to form another reaction zone for converting additional monomer into polymer.

Generally speaking, in the prior art, transfer agents have been added so as to have roughly the same concentration of chain transfer agent in each monomer feed. From an apparatus point of view, this can be achieved by mixing the transfer agent with the monomer fed before the monomer is compressed by the secondary compressor. The transfer agent is then added equally along the length of the tube, although it may be consumed unequally and so concentration variations along the tube may result.

In FIG. 1, a source 23 of transfer agent is connected to the intake of the primary compressor 4 and hence distributed, after passing through the secondary compressor 5, to the different monomer feeds 3 spaced along the tube 2. The recycle stream 8 coming from the LPS 20 and the purge compressor 21 is also passed to the intake of primary compressor 4. The recycle from the HPS 18 which contains unconsumed transfer agent is passed to the intake of the secondary compressor. Thus the transfer agent and monomer form a single, common gas stream with the desired concentration of transfer agent for compression in the secondary compressor 5 and for supply to the various feed positions 3 along the tube 2.

Furthermore, by selecting a transfer agent which has a low chain transfer activity, higher concentrations of transfer agent have to be used in the non-polymer gaseous fraction of the tube contents to achieve a target MI. The low chain transfer activity contributes to the creation of small transfer agent concentrations along the length of the tube where the chain transfer agents also have a low reactivity ratio. By using unsaturated transfer agents with low chain transfer activity, branches are formed along the polymer backbone and the density of the resulting polymer is reduced. In such apparatus, mostly chain transfer agents have been used having a chain transfer constant of less than 0.03.

The recycle from the HPS and LPS still contain, for transfer agents with a low reactivity ratio, a high level of transfer agent and the amount that is added from the source 23 is low relative to that present in the recycle 26 and 8.

It would be desirable to have methods and apparatus for transfer agent addition and selection so as to increase the process efficiency while obtaining a satisfactory commercial product, or to produce more satisfactory commercial products at prevailing process efficiencies.

SUMMARY

The present invention provides apparatus and methods which advantageously uncouple, or reduce the dependency, between the monomer concentration and transfer agent concentration and permit these concentrations to be varied along the tube length.

In one embodiment the invention provides a tubular polymerization reactor apparatus including a source of fresh monomer, first and second compressor stages for compressing monomer, a reactor tube, multiple feeds spaced lengthwise along the reactor tube for supplying monomer to the reactor, multiple free-radical or catalyst injection positions spaced lengthwise along the reactor tube for causing monomer to be converted into polymer inside the reactor, separators for receiving a monomer-polymer mixture from the reactor tube and separating the mixture into a volatile monomer-rich phase and molten polymerization phase, conduits for recycling the monomer-rich phase to the first and/or second compressor stages for recycling unreacted monomer to the reactor tube, and a source of transfer agent for modifying the molecular weight of the polymer for compression and feeding to the reactor tube. Compressor means is provided for compressing a transfer agent rich stream separately from a transfer agent-poor monomer stream and means is provided for feeding the compressed transfer agent rich stream to a polymerization reaction zone upstream of at least one reaction zone receiving the transfer agent-poor stream.

In another embodiment the invention provides a tubular polymerization reactor apparatus including a source of fresh monomer, first and second compressor stages for compressing monomer, a reactor tube, multiple feeds spaced lengthwise along the reactor tube for supplying monomer to the reactor, multiple free-radical or catalyst injection positions spaced lengthwise along the reactor tube for causing monomer to be converted into polymer inside the reactor, separators for receiving a monomer-polymer mixture from the reactor tube and separating the mixture into a volatile monomer-rich phase and molten polymerization phase, conduits for recycling the monomer-rich phase to the first and/or second compressor stages for recycling unreacted monomer to the reactor tube, and a source of transfer agent for modifying the molecular weight of the polymer for compression and feeding to the reactor tube. Compressor means is provided for compressing a transfer agent rich stream separately from a transfer agent-poor monomer stream and means is provided for feeding the compressed transfer agent rich stream to a polymerization reaction zone upstream of at least one reaction zone receiving the transfer agent-poor stream containing 70 wt. % or less of the transfer agent relative to the transfer agent-rich stream.

In still another embodiment the invention provides a tubular polymerization reactor apparatus including a source of fresh monomer, first and second compressor stages for compressing monomer, a reactor tube, multiple feeds spaced lengthwise along the reactor tube for supplying monomer to the reactor, multiple free-radical or catalyst injection positions spaced lengthwise along the reactor tube for causing monomer to be converted into polymer inside the reactor, separators for receiving a monomer-polymer mixture from the reactor tube and separating the mixture into a volatile monomer-rich phase and molten polymerization phase, conduits for recycling the monomer-rich phase to the first and/or second compressor stages for recycling unreacted monomer to the reactor tube, and a source of transfer agent for modifying the molecular weight of the polymer for compression and feeding to the reactor tube. Compressor means is provided for compressing a transfer agent rich stream separately from a transfer agent-poor monomer stream and means is provided for feeding the compressed transfer agent rich stream to a polymerization reaction zone upstream of at least one reaction zone receiving the transfer agent-poor stream containing between 70 wt. % to 30 wt. % of the transfer agent relative to the transfer agent-rich stream.

In yet another embodiment the invention provides a tubular polymerization reactor apparatus including a source of fresh monomer, first and second compressor stages for compressing monomer, a reactor tube, multiple feeds spaced lengthwise along the reactor tube for supplying monomer to the reactor, multiple free-radical or catalyst injection positions spaced lengthwise along the reactor tube for causing monomer to be converted into polymer inside the reactor, separators for receiving a monomer-polymer mixture from the reactor tube and separating the mixture into a volatile monomer-rich phase and molten polymerization phase, conduits for recycling the monomer-rich phase to the first and/or second compressor stages for recycling unreacted monomer to the reactor tube, and a source of transfer agent for modifying the molecular weight of the polymer for compression and feeding to the reactor tube. Compressor means is provided for compressing a transfer agent rich stream separately from a transfer agent-poor monomer stream and means is provided for feeding the compressed transfer agent rich stream to a polymerization reaction zone upstream of at least one reaction zone receiving the transfer agent-poor stream containing less than 30 wt. % of the transfer agent relative to the transfer agent rich stream.

In still yet another embodiment the invention provides a process for the polymerization of ethylene, wherein the process includes combining fresh monomer and recycled monomer; compressing the combined monomer; supplying the monomer using multiple feeds to multiple reaction zones in a tubular reactor for polymerization by a free radical initiator to form a monomer-polymer mixture; separating the mixture into a volatile monomer-rich phase and molten polymer-rich phase; recycling for compression the monomer-rich phase and supplying the monomer-rich phase to the reactor; and introducing transfer agent into the reactor to modify the molecular weight of the polymer, and further wherein the transfer agent includes a chain terminating transfer agent having a transfer coefficient of greater than 0.01, the transfer agent being in a transfer agent rich stream separately from a transfer agent-poor monomer stream of the transfer agent, to a polymerization reaction zone upstream of at least one downstream reaction zone receiving the transfer agent-poor stream so as to achieve a depletion in the concentration of the transfer agent in the downstream reaction zone.

In yet still another embodiment the invention provides a process for the polymerization of ethylene, wherein the process includes combining fresh monomer and recycled monomer; compressing the combined monomer; supplying the monomer using multiple feeds to multiple reaction zones in a tubular reactor for polymerization by a free radical initiator to form a monomer-polymer mixture; separating the mixture into a volatile monomer-rich phase and molten polymer-rich phase; recycling for compression the monomer-rich phase and supplying the monomer-rich phase to the reactor; and introducing transfer agent into the reactor to modify the molecular weight of the polymer, and further wherein the transfer agent includes a chain terminating transfer agent having a transfer coefficient of greater than 0.01, the transfer agent being in a transfer agent rich stream separately from a transfer agent-poor monomer stream of the transfer agent, to a polymerization reaction zone upstream of at least one downstream reaction zone receiving the transfer agent-poor stream having 70 wt. % or less of the transfer agent relative to the transfer agent rich stream so as to achieve a depletion in the concentration of the transfer agent in the downstream reaction zone.

An additional embodiment of the invention is a process for the polymerization of ethylene, wherein the process includes combining fresh monomer and recycled monomer; compressing the combined monomer; supplying the monomer using multiple feeds to multiple reaction zones in a tubular reactor for polymerization by a free radical initiator to form a monomer-polymer mixture; separating the mixture into a volatile monomer-rich phase and molten polymer-rich phase; recycling for compression the monomer-rich phase and supplying the monomer-rich phase to the reactor; and introducing transfer agent into the reactor to modify the molecular weight of the polymer, and further wherein the transfer agent includes a chain terminating transfer agent having a transfer coefficient of greater than 0.01, the transfer agent being in a transfer agent rich stream separately from a transfer agent-poor monomer stream of the transfer agent, to a polymerization reaction zone upstream of at least one downstream reaction zone receiving the transfer agent-poor stream having between 70 wt. % and 30 wt. % of the transfer agent relative to the transfer agent rich-stream so as to achieve a depletion in the concentration of the transfer agent in the downstream reaction zone.

Even another embodiment the invention provides a process for the polymerization of ethylene, wherein the process includes combining fresh monomer and recycled monomer; compressing the combined monomer; supplying the monomer using multiple feeds to multiple reaction zones in a tubular reactor for polymerization by a free radical initiator to form a monomer-polymer mixture; separating the mixture into a volatile monomer-rich phase and molten polymer-rich phase; recycling for compression the monomer-rich phase and supplying the monomer-rich phase to the reactor; and introducing transfer agent into the reactor to modify the molecular weight of the polymer, and further wherein the transfer agent includes a chain terminating transfer agent having a transfer coefficient of greater than 0.01, the transfer agent being in a transfer agent rich stream separately from a transfer agent-poor monomer stream of the transfer agent, to a polymerization reaction zone upstream of at least one downstream reaction zone receiving the transfer agent-poor stream having less than 30 wt. % of the transfer agent relative to the transfer agent rich stream so as to achieve a depletion in the concentration of the transfer agent in the downstream reaction zone.

BRIEF DESCRIPTION OF DRAWINGS

These and other features, aspects, and advantages of the present invention will become better understood with reference to the following description, appended claims, and accompanying drawings, where:

DETAILED DESCRIPTION

Figure 3:
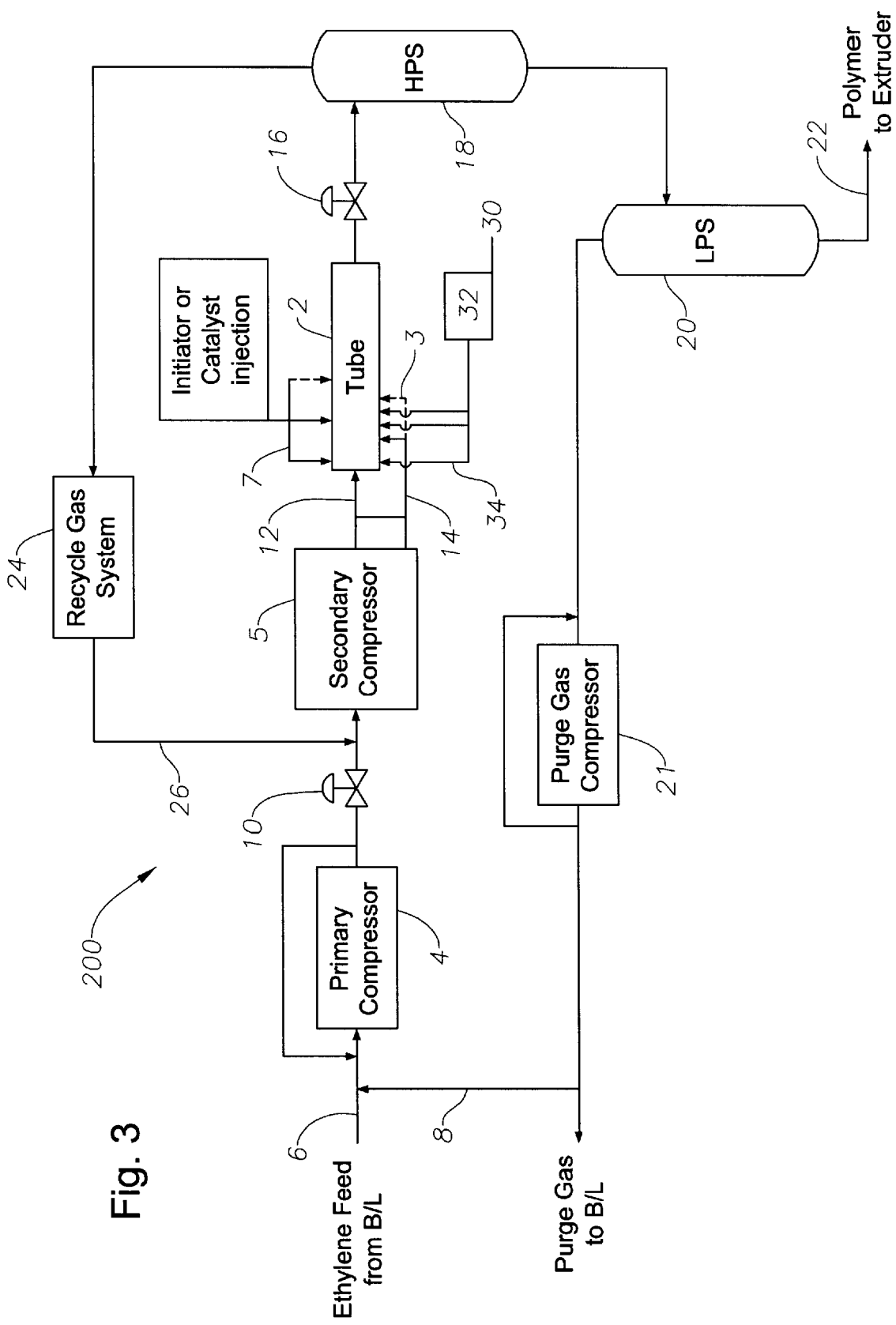
FIG. 3 shows one embodiment of a reactor apparatus of the invention.

In one embodiment, and referring now to FIG. 3, the present invention provides a tubular polymerization reactor apparatus 200 having:

a source of fresh monomer 6, unrecycled, generally not containing transfer agent;

medium and high pressure compressors 4 and 5, respectively, for compressing monomer;

a reactor tube 2;

multiple monomer feed 3, spaced lengthwise along the reactor tube 2 for supplying monomer to the tube;

multiple free-radical or catalyst injection positions 7 spaced lengthwise along the tube 2 for causing monomer to be converted into polymer inside the tube in a reaction zone (not shown);

separators 18 and 20 for receiving a monomer-polymer mixture from the reactor tube 2 and separating the mixture into a volatile monomer-rich phase and molten, polymer-rich phase;

conduits 8 and 26 for recycling the monomer-rich phase for compression and for recycling unreacted monomer or monomers to the tubular reactor; and a source of transfer agent 30 for modifying the molecular weight of the polymer including means 32 for compressing the transfer agent and feeding it to the tubular reactor via one or more transfer agent feeds 34 separately from the monomer feed(s) 3.

Figure 1:
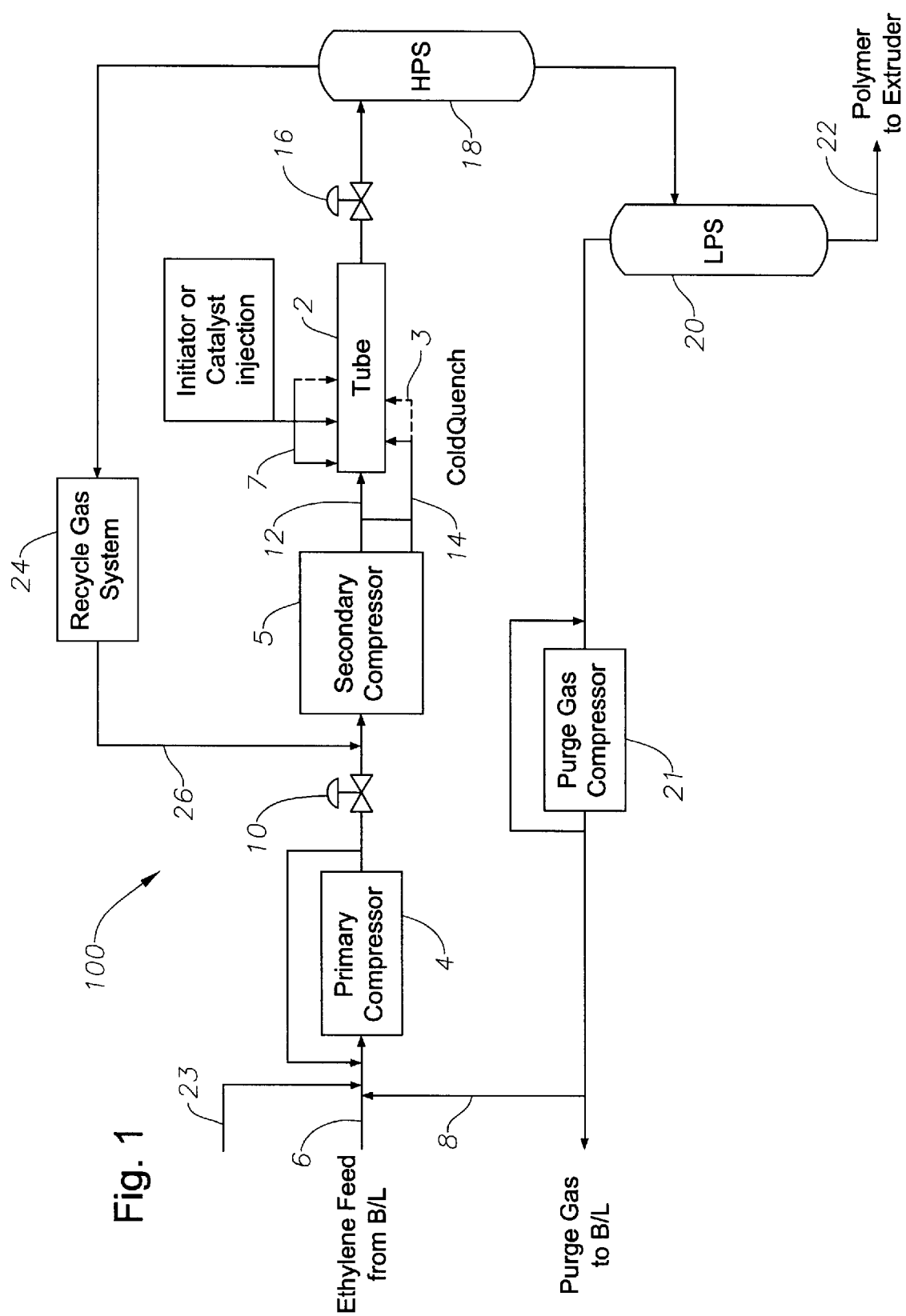
FIG. 1 shows a tubular polymerization reactor.
Figure 2:
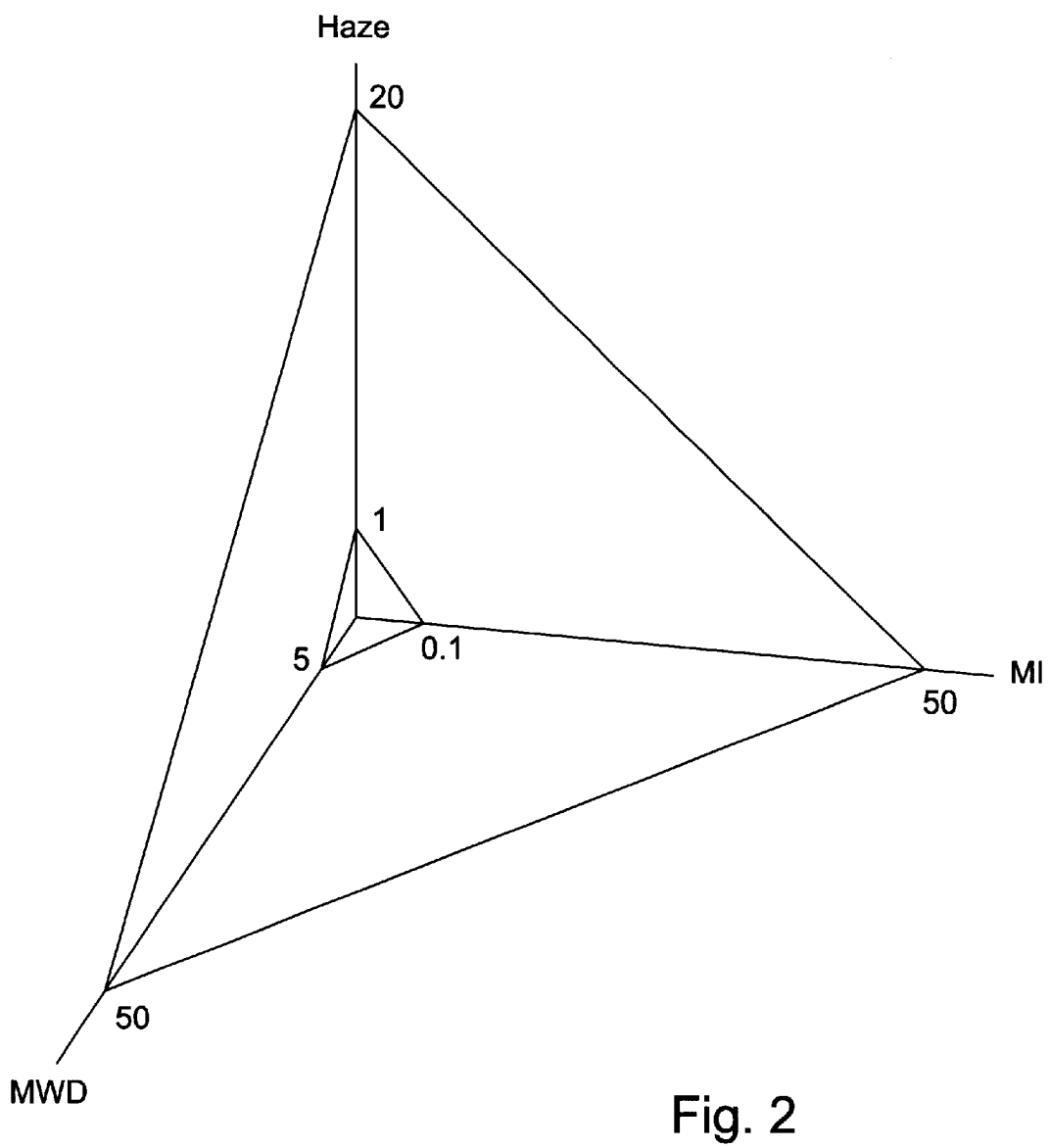
FIG. 2 shows a typical polyethylene product range and covers a melt index (MI) of from 0.1 to 50, a molecular weight distribution (MWD) of from 5 to 50 and a haze of from 1 to 20.

In the conventional apparatus described above with reference to FIG. 1, transfer agent and monomer were mixed before a final common compression step and so supplied at equal transfer agent/monomer ratios at the different feeds 3. By contrast, in embodiments of the invention, compressor means 32 is provided for compressing a transfer agent rich gas stream 30 separately from a transfer agent-poor gas stream 12, and a transfer agent feeds 34 are provided for feeding the compressed transfer agent-rich stream to a polymerization reaction zone upstream of at least one reaction zone receiving the transfer agent-poor stream. As a result less transfer agent is supplied towards the downstream end of the tubular reactor, i.e., the part of the reactor containing one or more reaction zones downstream of one or more reaction zones located towards the upstream end of the reactor than is supplied towards those upstream reaction zone or zones.

Examples of chain transfer agents include tetramethylsilane, cyclopropane, sulfur hexafluoride, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-buten-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichlorethane, acetronitrile, N-ethylacetamide, propylene, n-decane, N,N-diethylacetamide, cyclopentane, acetic anhydride, n-tridecane, n-butyl benzoate, isopropanol, toluene, hydrogen, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2,1-bromo-2-chlorethane, octene-1, 2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1,1,2-dibromoethane, dimethylamine, benzaldehyde, chloroform, 2-ethylhexene-1, propionaldehyde, 1,4-dichlorobutene-2, tri-n-butylphosphine, dimethylphosphine, methyl cyanoacetate, carbon tetrachloride, bromotrichloromethane, di-n-butylphosphine, acetaldehyde, and phosphine.

For further details of transfer agents, see Advances In Polymer Science, Vol. 7, p. 386–448 (1970). Table 7 therein ranks several transfer agents in order of the chain transfer constant determined under set conditions. The tendency to copolymerize is indicated by the reactivity, also determined under set conditions.

Typical monomers include: vinyl ethers such as vinyl methyl ether, vinyl n-butyl ether, vinyl phenyl ether, vinyl beta-hydroxy-ethyl ether, and vinyl dimethylamino-ethyl ether; olefins such as ethylene, propylene, butene-1, cis-butene-2, trans-butene-2, isobutylene, 3,3,-dimethylbutene-1, 4-methylpentene-1, octene-1, and styrene; vinyl type-esters such as vinyl acetate, vinyl butyrate, vinyl pivalate, and vinylene carbonate; haloolefins such as vinyl fluoride, vinylidene fluoride, tetrafluoroethylene, vinyl chloride, vinylidene chloride, tetrachloroethylene, and chlorotrifluoroethylene; acrylic-type esters such as methyl acrylate, ethyl acrylate, n-butyl acrylate, t-butyl acrylate, 2-ethylhexyl acrylate, alpha-cyanoisopropyl acrylate, beta-cyanoethyl acrylate, o-(3-phenylpropan-1,3,-dionyl)phenyl acrylate, methyl methacrylate, n-butyl methacrylate, t-butyl methacrylate, cyclohexyl methacrylate, 2-ethylhexyl methacrylate, methyl methacrylate, glycidyl methacrylate, betahydroxethyl methacrylate, beta-hydroxpropyl methacrylate, 3-hydroxy-4-carbomethoxy-phenyl methacrylate, N,N-dimethylaminoethyl methacrylate, t-butylaminoethyl methacrylate, 2-(1-aziridinyl)ethyl methacrylate, diethyl fumarate, diethyl maleate, and methyl crotonate; other acrylic-type derivatives such as acrylic acid, methacrylic acid, crotonic acid, maleic acid, methyl hydroxy, maleate, itaconic acid, acrylonitrile, fumaronitrile, N,N-dimethylacrylamide, N-isopropylacrylamide, N-t-butylacrylamide, N-phenylacrylamide, diacetone acrylamide, methacrylamide, N-phenylmethacrylamide, N-ethylmaleimide, and maleic anhydride; and other compounds such as allyl alcohol, vinyltrimethylsilane, vinyltriethoxysilane, N-vinylcarbazole, N-vinyl-N-methylacetamide, vinyldibutylphosphine oxide, vinyldiphenylphosphine oxide, bis-(2-chloroethyl) vinylphosphonate and vinyl methyl sulfide. The monomers/transfer agents are ranked in reactivity ratio order in Table 10. See id.

The difference in the concentration in mol % of transfer agent supplied to the successive reaction zones may be in excess of 20%. A simple constructional option for implementing a difference of such a magnitude is providing conduits for compressing some or all of the transfer agent which are separate from other conduits for compressing monomer. Therefore compressor means 32 may include a further compressor stage for an initial compression of the transfer agent obtained from the source of transfer agent 30, and a section of the second compressor stage connected to the outlet of the further compressor stage for raising the gas stream containing transfer agent to a pressure suitable for supplying to the reactor, the section being optionally used additionally for compressing part of the monomer obtained from the outlet of the first compressor stage, the transfer agent being passed through conduits segregated from another section of the second compressor stage which is used for compressing the transfer agent-poor monomer stream. In this manner fresh transfer agent is concentrated, to have effect in the upstream reaction zone.

The transfer agent rich stream may be connected to be introduced upstream of all reaction zones receiving a transfer agent-poor stream. This may magnify the effect and benefit of embodiments of the invention. In another embodiment, where three or more reaction zones are used, the transfer agent rich stream may be supplied to a reaction zone intermediate two reaction zones receiving a transfer agent poor-stream. This may tend to dilute the benefit of upstream transfer agent injection.

An added modification in another embodiment is to further uncouple the volatile part of the mixture from the tubular reactor outlet from the general monomer feed and to not distribute the residual transfer agent present therein to the feed streams used for the downstream reaction zones. The monomer-rich recycled stream from the combined separators is connected to be supplied to an extent exceeding from 75% by volume of the total recycle stream mass to one or more reaction zones upstream of at least one downstream reaction zone. The remaining part of the recycle stream mass can be combined with the monomer feed supplied to the medium pressure compressor intake for distribution to all other feed positions. The effect can be optimized by providing a recycled monomer-rich feed connected to be supplied to an extent of from 75 to 100% of its volume to a first reaction zone located furthest upstream of all other reaction zones spaced lengthwise along the tubular reactor.

Construction of an apparatus for providing such an arrangement results where the transfer agent-rich stream is connected to be passed from the further compressor stage and combined with the recycled monomer-rich stream for compression in the segregated section of the second compressor stage.

While the monomer can be any molecule or molecules capable of addition polymerization by either a free-radical mechanism or coordination catalytic mechanism, the predominant monomer may be ethylene. Other monomers which incorporate less easily and may have transfer-activity and a molecular weight limiting effect (and indeed can, for some purposes, be regarded as incorporating transfer agents) include: vinyl acetate, ethyl acrylate, methyl acrylate, butyl acrylate, and the like. Most commonly ethylene is used at a mole concentration of at least 90%, or 96%, or 98%, the percentages being based on the total weight of all monomer and transfer agent present.

While, in theory, Ziegler-Natta catalysts can be used such as $TiCl_3$ based catalysts with an aluminum alkyl activator, or metallocene catalysts with an alumoxane or non-coordinating anion activator, or using a free-radical initiator, generally initiators can be selected from the list given in *Advances of Polymer Science* op cit.

Preferably, the transfer agents have the properties:
they possess high transfer activity which enables them to reduce the melt index (MI) at relatively low concentrations of transfer agents. A review of the transfer agents in *Advances of Polymer Science* op cit will show the suitable candidates. Particularly suited are methyl vinyl sulfide, and n-butyronitrile; and
they incorporate and have a high reactivity ratio so the concentration will deplete, in the absence of further addition downstream, as the reaction mixture passes downstream in the tube through the successive reaction zones, with the proviso that such transfer agents to do not lower the density and incorporate at the ends of the polymer chain without creating branches.

Other transfer agents may be present in addition, to form short-chain branches to the extent that the desired conversion enhancing effect is not negated.

Operating conditions for tubular reactors are in general well known, but the amount of monomer vs. transfer agent fed can advantageously be biased to achieve a high transfer agent concentration in the upstream feed or feeds.

The addition of the free-radical initiator to a monomer mixture causes generally the formation of a reaction zone in which monomer is converted exothermally and the resulting temperature rise is controlled by cooling and addition of further monomer to the downstream end of the reaction zone. Thus, temperature and reagent concentration can vary along the length of the tubular reactor.

Embodiments of the invention generally provide, for this aspect, a process for polymerization of ethylene which includes combining fresh monomer and recycled monomer and compressing the combined recycled and fresh monomer and supplying the monomer using multiple feeds to multiple reaction zones in a tubular reactor for polymerization by a free radical initiator to form a monomer-polymer mixture; and separating the mixture into a volatile monomer-rich phase and molten polymer-rich phase with the monomer-rich phase being recycled for compression and supplying to the reactor, the process further including introducing transfer agent into the reactor to modify the molecular weight of the polymer.

In such embodiments, the transfer agent includes a chain terminating transfer agent of a carbonyl containing linear compound incorporating predominantly in a position close to the end of the polymer chain, having a transfer coefficient of greater than 0.01, the transfer agent being in a transfer agent rich stream separately from a transfer agent-poor monomer stream to a polymerization reaction zone upstream of at least one reaction zone receiving the transfer agent-poor stream.

As indicated above, the chain terminating transfer agent rich stream is introduced preferably upstream of all reaction zones receiving a transfer agent-poor stream. Similarly the monomer-rich recycled stream from at least one of the separators is advantageously supplied to an extent exceeding 75% by volume to one or more reaction zones upstream of at least one downstream reaction zone. Suitably a recycled monomer-rich feed is supplied to an extent of from 75 to 100% of its volume to a reaction zone upstream of all other reaction zones spaced lengthwise along the tubular reactor.

A particular chain terminating transfer agent contemplated may predominantly be propionaldehyde. Its effects may be focused on one or more reaction zones. Propionaldehyde may cause a linear polymer to be formed, which can act as the platform for added polymerization in downstream polymerization reaction zones and higher conversion therein, without materially upsetting product quality. The chain terminating transfer agent may be added in such amounts in such a way that the concentration of chain terminating transfer agent at the outlet of the tube is at least 50% less than that at the uppermost upstream reaction zone.

While in a conventional process using an almost homogeneous transfer agent distribution, the process is run so as to convert as much of the polymer in the first reaction zone as possible, it has been surprisingly found that advantageous operation results by increasing the proportion of transfer agent further by reducing the amount of monomer supplied upstream, particularly the first upstream reaction zone. The mol % of monomer fed in the stream supplied to the reaction zone located furthest upstream may be less than that at least one reaction zone downstream thereof.

By using a chain terminating transfer agent which gives by and large a linear polyethylene chain backbone, the process may not have to be manipulated to obtain desired levels of branching and branching may be provided by a transfer agent selected for that purpose. Such chain transfer agents may incorporate poorly such as propylene or butene-1 but preferably are selected to incorporate well, such as methyl methacrylate, as noted supra. In this way, the monomer rich part of the recycle contains relatively low levels of chain forming transfer agents for introduction in the upstream reaction zones.

The chain branch forming transfer agent may be fed predominantly to reaction zone or zones downstream of an upstream reaction zone.

Although the present invention has been described in considerable detail with reference to certain preferred versions thereof, other versions are possible. For example, while polyethylenes are discussed, other polyolefins are contemplated. Therefore, the spirit and scope of the appended claims should not be limited to the description of the preferred versions contained herein, which include, without limitation, the following more preferred embodiments: a tubular polymerization reactor apparatus comprising: (a) a source of fresh monomer; (b) first and second compressor stages for compressing monomer; (c) a reactor tube; (d) multiple feeds, spaced lengthwise along the reactor tube for supplying monomer to the reactor; (e) multiple free-radical or catalyst injection positions spaced lengthwise along the tubular reactor for causing monomer to be converted into polymer inside the tubular reactor; (f) separators for receiving a monomer-polymer mixture from the reactor tube and separating said mixture into a volatile monomer-rich phase and molten polymerization phase; (g) conduits for recycling the monomer-rich phase to the first and/or second compressor stages for recycling unreacted monomer to the reactor tube; and (h) a source of transfer agent for modifying the molecular weight of the polymer for compression and feeding to the reactor tube; wherein compressor means is provided for compressing a transfer agent rich stream separately from a transfer agent-poor monomer stream and means is provided for feeding the compressed transfer agent rich stream to a polymerization reaction zone upstream of at least one reaction zone receiving the transfer agent-poor stream; and also the following even more preferred embodiments: the reactor apparatus wherein said transfer agent-poor stream contains less than 30 wt. % of the transfer agent relative to the transfer agent rich stream; the reactor apparatus wherein said transfer agent-poor stream contains 70 wt. % or less of the transfer agent relative to the transfer agent-rich stream; the reactor apparatus wherein said transfer agent-poor stream contains between 70 wt. % and 30 wt. % of the transfer agent relative to the transfer agent-rich stream; and any of the aforementioned more preferred or even more preferred embodiments with the following additionally more preferred embodiments, alone or in combination as would be apparent to one of skill in the art in possession of the present disclosure: the reactor apparatus wherein compressor means comprises a further compressor stage for an initial compression of the transfer agent obtained from the source of transfer agent, and a section of the second compressor stage, connected to the outlet of the further compressor stage for raising the gas stream containing transfer agent to a pressure suitable for supplying to the reactor, said section being optionally used additionally for compressing part of the monomer obtained from the outlet of the first compressor stage, said transfer agent being passed through conduits segregated from another section of the second compressor stage which is used for compressing the transfer agent-poor monomer stream; the reactor apparatus wherein the transfer agent rich stream is connected to be introduced upstream of all reaction zones receiving a transfer agent-poor stream, particularly wherein the monomer-rich recycled stream from at least one of the separators is connected to be supplied to an extent exceeding 75% by volume to one or more reaction zones upstream of at least one downstream reaction zone, or even more particularly wherein a recycled monomer-rich feed is connected to be supplied to an extent of from 75 to 100% of its volume to a reaction zone upstream of all other reaction zones spaced lengthwise along the tubular reactor; the reactor apparatus wherein the transfer agent is connected to be passed from the further compressor stage and combined with the recycled monomer-rich stream for compression in the segregated section of the second compressor stage, particularly wherein a pair of sources of transfer agents are arranged for connection to different reaction zones; and another more preferred embodiment which is a process for the polymerization of ethylene comprising: (a) combining fresh monomer and recycled monomer and compressing the combined monomer and supplying the monomer using multiple feeds to multiple reaction zones in a tubular reactor for polymerization by a free radical initiator to form a monomer-polymer mixture; (b) separating the mixture into a volatile monomer-rich phase and molten polymer-rich phase; (c) recycling for compression said monomer-rich phase and supplying said monomer-rich phase to the reactor; and (d) introducing transfer agent into the reactor to modify the molecular weight of the polymer; wherein the transfer agent comprises a chain terminating transfer agent having a transfer coefficient of greater than 0.01, said transfer agent being in a transfer agent rich stream separately from a transfer agent-poor monomer stream of the transfer agent, to a polymerization reaction zone upstream of at least one downstream reaction zone receiving the transfer agent-poor stream so as to achieve a depletion in the concentration of the transfer agent in said at least one downstream reaction zone; and even more preferred embodiments which are said process wherein said transfer agent-poor stream comprises less than 30 wt. % of the transfer agent relative to the transfer agent-rich stream; wherein said transfer agent-poor stream comprises 70 wt. % or less of the transfer agent relative to the transfer agent-rich stream; said process wherein said transfer agent-poor stream comprises between 70 wt. % and 30 wt. % of the transfer agent relative to the transfer agent-rich stream; or any of the aforementioned more preferred or even more preferred processes, alone or in combination as would be apparent to one of ordinary skill in the art in possession of the present disclosure, of the following: said process wherein the transfer agent-rich stream is introduced upstream of all reaction zones receiving a transfer agent-poor stream; said process wherein the monomer-rich recycled stream from at least one of the separators is supplied to an extent exceeding 75% by volume to one or more reaction zones upstream of at least one downstream reaction zone, and more particularly wherein a recycled monomer-rich feed is supplied to an extent of from 75 to 100% of its volume to a reaction zone upstream of all other reaction zones spaced lengthwise along the tubular reactor, even more particularly wherein the transfer agent supplied at an upstream feed comprises propionaldehyde and/or wherein the concentration of transfer agent at the outlet of the tubular reactor is at least 50% less than the concentration transfer agent in the uppermost upstream reaction zone; wherein the transfer agent is selected from the group consisting of propionaldehyde, methyl vinyl sulfide, n-butyronitrile, propylene, butene-1, 4-methylpentane-1, isobutylene, diisobutylene, acetaldehyde, and mixtures thereof.

What is claimed is:

1. A process for the polymerization of ethylene comprising:
   (a) combining fresh monomer and recycled monomer and compressing the combined monomer and supplying the monomer using multiple feeds to multiple reaction zones in a tubular reactor for polymerization by a free radical initiator to form a monomer-polymer mixture;
   (b) separating the mixture into a volatile monomer-rich phase and molten polymer-rich phase;

(c) recycling for compression said monomer-rich phase and supplying said monomer-rich phase to the reactor; and (d) introducing transfer agent into the reactor to modify the molecular weight of the polymer;

wherein the transfer agent comprises a chain terminating transfer agent having a transfer coefficient of greater than 0.01, said transfer agent being in a transfer agent rich stream separately from a transfer agent-poor monomer stream of the transfer agent, to a polymerization reaction zone upstream of at least one downstream reaction zone receiving the transfer agent-poor stream so as to achieve a depletion in the concentration of the transfer agent in said at least one downstream reaction zone.

2. The process of claim 1, wherein said transfer agent-poor stream comprises less than 30 wt. % of the transfer agent relative to the transfer agent-rich stream.

3. The process of claim 1, wherein said transfer agent-poor stream comprises 70 wt. % or less of the transfer agent relative to the transfer agent-rich stream.

4. The process of claim 1, wherein said transfer agent-poor stream comprises between 70 wt. % and 30 wt. % of the transfer agent relative to the transfer agent-rich stream.

5. The process of claim 1, wherein the transfer agent-rich stream is introduced upstream of all reaction zones receiving a transfer agent-poor stream.

6. The process of claim 5, wherein the monomer-rich recycled stream from at least one of the separators is supplied to an extent exceeding 75% by volume to one or more reaction zones upstream of at least one downstream reaction zone.

7. The process of claim 6, wherein a recycled monomer-rich feed is supplied to an extent of from 75 to 100% of its volume to a reaction zone upstream of all other reaction zones spaced lengthwise along the tubular reactor.

8. The process of claim 7, wherein the transfer agent supplied at an upstream feed comprises propionaldehyde.

9. The process of claim 7, wherein the concentration of transfer agent at the outlet of the tubular reactor is at least 50% less than the concentration transfer agent in the uppermost upstream reaction zone.

10. The process of claim 1, wherein the transfer agent is selected from the group consisting of propionaldehyde, methyl vinyl sulfide, n-butyronitrile, propylene, butene-1,4-methylpentane-1, isobutylene, diisobutylene, acetaldehyde, and mixtures thereof.

* * * * *